United States Patent
Kikuchi et al.

[11] Patent Number: 6,047,097
[45] Date of Patent: Apr. 4, 2000

[54] OPTICAL COUPLER

[75] Inventors: Kimihiro Kikuchi; Yoshihiro Someno; Atsunori Hattori; Shoichi Kyoya, all of Miyagi-ken, Japan

[73] Assignee: Alps Electric Co., Ltd., Japan

[21] Appl. No.: 09/111,934

[22] Filed: Jul. 8, 1998

[30] Foreign Application Priority Data

Jul. 8, 1997 [JP] Japan ................................ 9-182650

[51] Int. Cl.⁷ ........................................... G02B 6/26
[52] U.S. Cl. ........................ 385/39; 385/41; 385/42; 385/43
[58] Field of Search ............................. 385/39, 41, 42, 385/43, 48, 51, 46, 50, 54, 70

[56] References Cited

U.S. PATENT DOCUMENTS

| | | | |
|---|---|---|---|
| 5,261,018 | 11/1993 | Suganuma et al. | 385/51 |
| 5,463,708 | 10/1995 | Yui et al. | 385/49 |
| 5,479,548 | 12/1995 | Cote' et al. | 385/51 |
| 5,694,509 | 12/1997 | Uemura et al. | 385/51 X |

FOREIGN PATENT DOCUMENTS

| | | |
|---|---|---|
| 0 343 588 A1 | 5/1989 | European Pat. Off. . |
| 0 439 125 A1 | 7/1991 | European Pat. Off. . |
| 0 475 494 A1 | 3/1992 | European Pat. Off. . |
| WO 94/08262 | 4/1994 | WIPO . |

*Primary Examiner*—Phan T. H. Palmer
*Attorney, Agent, or Firm*—Brinks Hofer Gilson & Lione

[57] ABSTRACT

An optical coupler including optical fibers having gaps between first coverings and second coverings corresponding thereto. Each cladding of the two optical fibers is formed into a proper shape, with a taper of a proper thickness. The two optical fibers are then joined together, forming a joined portion which engages an engaging groove in a pair of blocks and the pair of blocks are affixed together by welding. Thereafter, the second coverings are affixed to cutouts in a retainer member. Lastly, the retainer, fitted to the blocks, is affixed thereto. Such an optical coupler is highly practical, does not allow deterioration of light dividing properties caused by changes in the length of the cladding joined portion as a result of an external stress, and prevents breakage of the joined portion.

1 Claim, 3 Drawing Sheets

AFFIXMENT
BY WELDING

OPTICAL COUPLER

BACKGROUND OF THE INVENTION

1. Field of the Invention

The present invention relates to an optical coupler in which a light signal transmitted through one of the optical fibers is divided and transmitted through both of the optical fibers.

2. Description of the Related Art

In general, an optical fiber comprises a cylindrical core with a high index of refraction, a cylindrical cladding formed around and covering the core and having a low index of refraction, a cylindrical first covering formed around and covering the cladding, and a cylindrical second covering formed around and covering the first covering. Two such optical fibers are prepared. When the cladding of each optical fiber is formed into a proper length with a taper of a proper thickness, and the claddings are joined together, the light signal transmitted through one of the optical fibers can be divided and transmitted through both of the optical fibers at the portion where the optical fibers are joined together. In such an optical coupler, however, a desired dividing characteristic can not be obtained when the length and thickness of the cladding joined portion change.

A conventional example of such an optical coupler is disclosed in Japanese Unexamined Patent Publication No. 6-308354 which proposes a method of affixing to a retainer member the claddings, the first coverings, and the second coverings. In the method, predetermined lengths of the first and second coverings of two optical fibers are stripped and exposed. Then, the portion where the claddings are joined together is inserted into the retainer member in order to bond the claddings, the first coverings, and the second coverings of the two optical fibers to both sides of the retainer member, using an adhesive.

In the aforementioned optical coupler, however, the cladding, the first covering, and the second covering of each optical fiber are integrally affixed to the retainer member, so that when an external mechanical stress is exerted onto the second coverings, or when a stress causes expansion or contraction of the second coverings caused by changes in environmental temperatures, the stress acts directly on the cladding joined portion. This leads to, for example, deterioration of the optical properties of the optical coupler as a result of changes in the length of the cladding joined portion, or in the worst case to breakage of the cladding joined portion. In addition, the adhesive, used as an affixing means for affixing the optical fibers, needs to have high adhesive strength with respect to both the optical fibers and the retainer member, taking into account the use environment of the adhesive which expands or contracts due to changes in temperature and humidity. Therefore, the types of materials which may be used for forming the conventional optical coupler are limited in number.

SUMMARY OF THE INVENTION

Accordingly, it is an object of the present invention to provide an optical coupler comprising optical fibers, each having a second covering formed around and covering a first covering associated thereto so as to be spaced from its associated first covering. These second coverings are deformed in the respective gaps in order to mechanically affix them to retainer members. By virtue of such a structure, when the optical fibers are being mechanically affixed to the retainer members by press-fitting or the like, only the outer second covering layers need to be deformed, so that the cores covered by their respective first coverings are spaced from their respective second coverings. Therefore, any external stress acting on the second coverings is not transmitted to the claddings through their respective first coverings, so that it is possible to prevent changes in light dividing properties caused by changes in the length of the cladding joined portion, as well as breakage of the cladding joined portion. In addition, the optical fibers are affixed to the retainer members by a mechanical means, such as press-fitting, so that compared to the case where the optical fibers are affixed with an adhesive, the optical coupler of the present invention allows greater freedom of selection of optical coupler materials, and is highly practical.

To this end, according to the present invention, there is provided an optical coupler comprising two optical fibers, each including a cladding having a low index of refraction and covering a core with a high index of refraction, and a first covering and a second covering that are formed around and cover the cladding associated thereto; wherein the claddings of the two optical fibers are joined together, forming a cladding joined portion, and the secondary coverings located exteriorly of the cladding joined portion are affixed to a retainer member; and wherein gaps are formed between the first coverings and the second coverings corresponding thereto in order to allow the second coverings to be deformed in the corresponding gaps and be mechanically affixed to the retainer member.

The second coverings may be mechanically affixed to the retainer by forming a cutout in the retainer with a smaller outer diameter than the second coverings, and press-fitting the second coverings into the cutout.

DESCRIPTION OF THE PREFERRED EMBODIMENT

Figure 1:
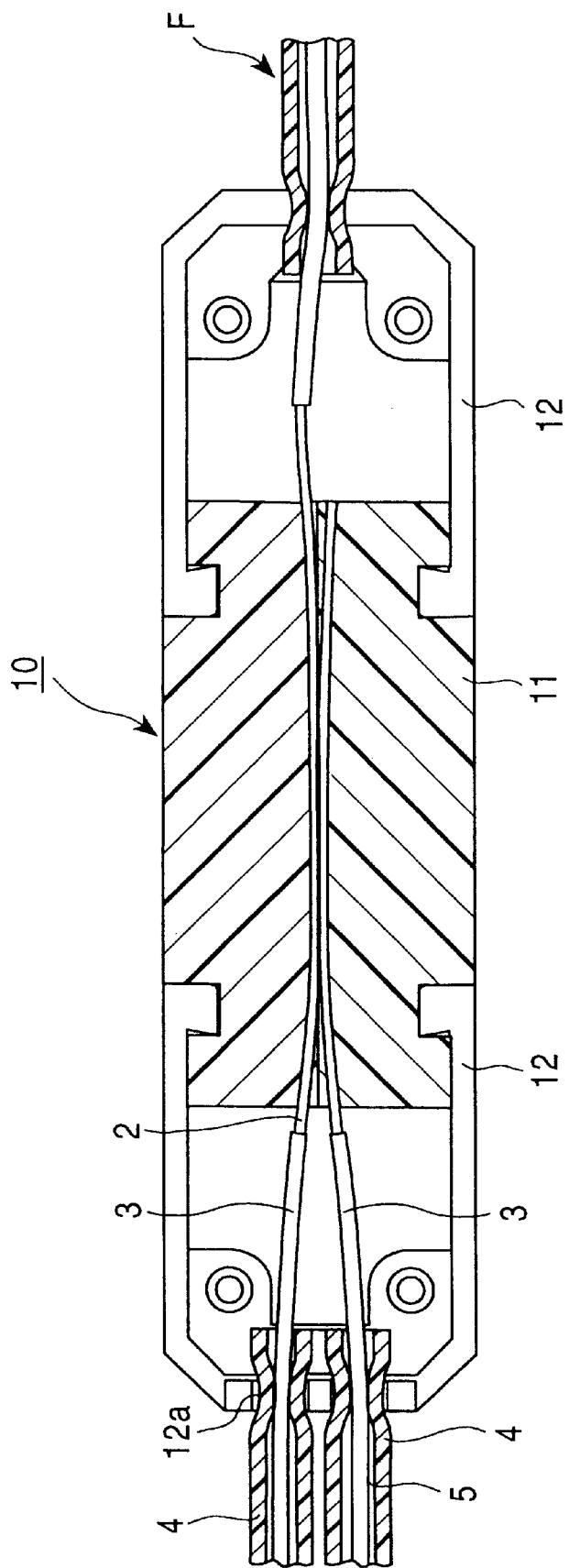
FIG. 1 is a sectional view of an embodiment of an optical coupler in accordance with the present invention.
Figure 2:
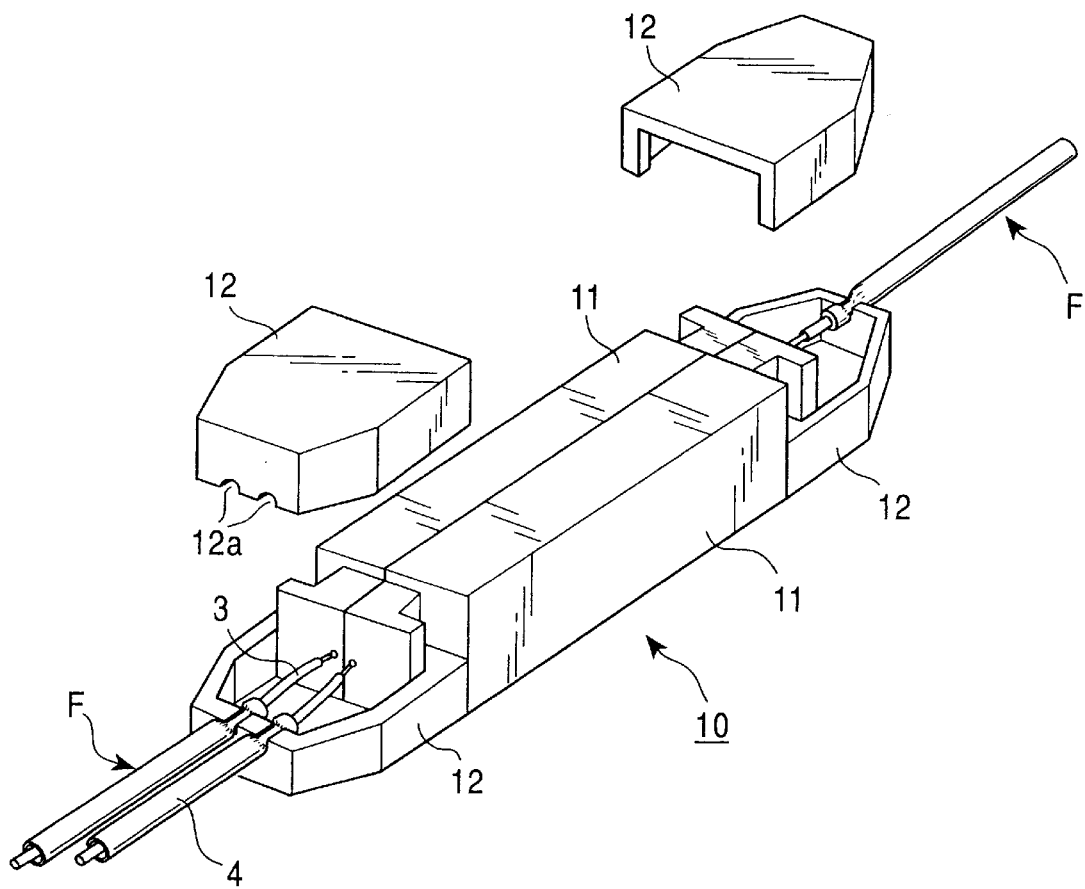
FIG. 2 is a perspective view of the optical coupler.
Figure 3:
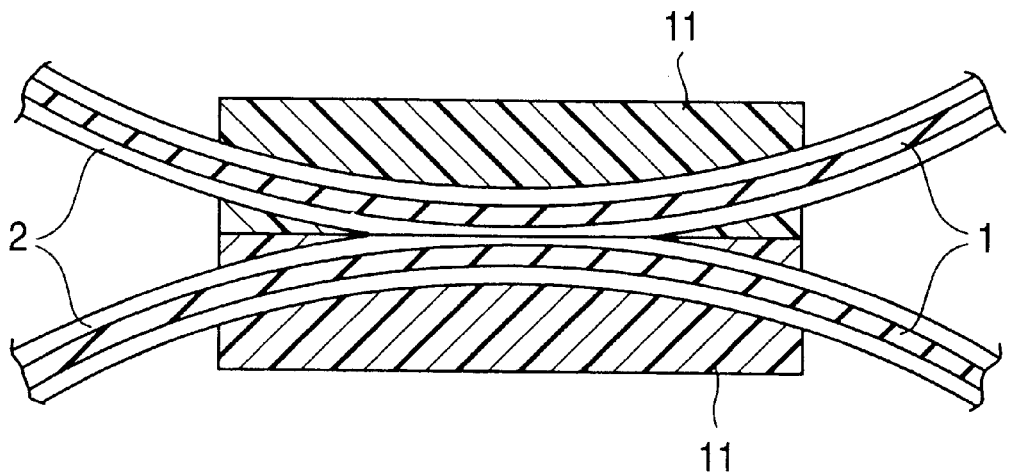
FIG. 3 is a sectional view of the optical coupling portion of the optical coupler.
Figure 4:
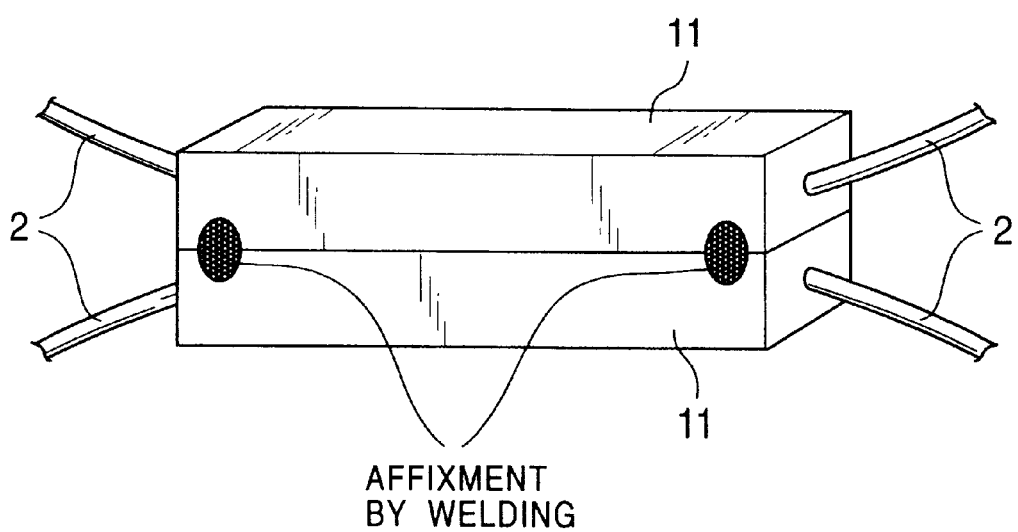
FIG. 4 is an appearance of the optical coupling portion.

A description will now be given of an embodiment of the present invention, with reference to the drawings. FIG. 1 is a sectional view of an embodiment of an optical coupler in accordance with the present invention. FIG. 2 is a perspective view of the optical coupler. FIG. 3 is a sectional view of the optical coupling portion of the optical coupler. FIG. 4 is an appearance of the optical coupling portion.

The optical fibers F of FIGS. 1 to 4 each comprise a cylindrical core 1 extending exteriorly from the center of its associated optical fiber F and having a high index of refraction; a cladding 2 formed around and covering its associated cylindrical core 1 and having a low index of refraction; a cylindrical first covering 3 formed around and covering its associated cladding 2; and a cylindrical second coverings 4 formed around and covering its associated cylindrical first covering 3. A gap 5 is provided between each first covering 3 and its associated second covering 4. A specific example of a material used for the cores 1 is $SiO_2$; that for the claddings 2 is a metal-doped $SiO_2$; that for the first coverings 3 is urethane resin; and that for the second coverings 4 is Teflon.

As shown in FIGS. 1 and 2, the housing 10 of the optical coupler comprises a pair of blocks 11 and four retainer members 12 fitted to both sides of the pair of blocks 11. A groove for engaging a cladding 2 joined portion is formed in the opposing faces of the blocks 11. Cutouts 12a having a smaller outer diameter than the second claddings 4 are formed in each retainer member 12.

When the aforementioned two optical fibers F are used to form an optical coupler, a proper length of each second covering 4 in the housing 10 is peeled off, whereby a portion of each first covering 3 is exposed. A proper length of each exposed first cover 3 in the blocks 11 is peeled off, whereby a portion of each cladding 2 is exposed. As shown in FIG. 3, the two claddings 2 of the optical fiber F are then each formed into a proper length, with a taper of a proper thickness. Thereafter, the two claddings 2 are joined together, forming a cladding 2 joined portion. With the joined portion engaging the engaging groove in the pair of blocks 11, the pair of blocks 11 are affixed together by welding, as shown in FIG. 4. As shown in FIG. 2, the second coverings 4 are affixed to their corresponding cutouts 12a in the retainer members 12 by press-fitting them. Lastly, when the retainer members, fitted to the blocks 11, are affixed thereto, an optical coupler, such as that shown in FIG. 1, is formed. It is to be noted that when the second coverings 4 are deformed as they are press-fitted into the cutouts 12a in the retainers 12, the respective gaps 5 must be formed so as to allow deformation therein. Therefore, it is necessary to set the size of the cutouts 12a taking this into account.

In the optical coupler constructed in the above-described manner, the first coverings 3, the claddings 2, and the cores 1 are spaced from their respective second coverings 4 affixed by press-fitting to their respective cutouts 12a of the retainer members 12, so that any external stress acting on the second coverings 4 is not transmitted to the claddings their respective claddings 2 through their respective first coverings 3. Therefore, it is possible to prevent changes in optical properties, caused by changes in the length of the cladding 2 joined portion, as well as breakage of the joined portion. In addition, the optical fibers 2 are affixed to their respective cutouts 12a in the retainer members by a mechanical means, such as press-fitting, so that compared to the case where the optical fibers 2 are affixed with an adhesive, the optical coupler has more stable optical properties with respect to changes in temperature and humidity, allows greater freedom of selection of optical coupler materials, and is highly practical.

The present invention is carried out in the above-described form, and provides the following advantages.

In mechanically affixing the optical fibers to the retainer members by press-fitting or the like as a result of deforming the second coverings of the optical fibers, formed around and spaced from their respective first coverings, within their respective gaps, only the outer second covering layers need to be deformed, so that the cores covered with the first coverings are spaced from their respective second coverings. Therefore, any external stress acting on the second coverings is not transmitted through their respective first coverings, thereby preventing changes in optical properties caused by changes in the length of the cladding joined portion, and breakage of the joined portion. In addition, the optical fibers are affixed to the respective retainer members by a mechanical means, such as press-fitting, so that compared to the case where the optical fibers are affixed using an adhesive, the optical coupler has more stable optical properties with respect to changes in temperatures and humidity, allows greater freedom of selection of optical coupler materials, and is highly practical.

What is claimed is:

1. An optical coupler, comprising:

two optical fibers, each including a cladding having a low index of refraction and covering a core with a high index of refraction, and a first covering and a second covering that are formed around and cover said cladding associated thereto;

wherein said claddings of said two optical fibers are joined together, forming a cladding joined portion, and said secondary coverings located exteriorly of the cladding joined portion are affixed to a retainer member; and wherein gaps are formed between said first coverings and said second coverings corresponding thereto in order to allow said second coverings to be deformed in the corresponding gaps and be mechanically affixed to the retainer member.

* * * * *